United States Patent

[11] 3,622,867

| [72] | Inventors | Thomas B. Topper;<br>Gilbert D. Throop, both of West Middlesex, Pa. |
|---|---|---|
| [21] | Appl. No. | 29,158 |
| [22] | Filed | Apr. 16, 1970 |
| [45] | Patented | Nov. 23, 1971 |
| [73] | Assignee | Westinghouse Electric Corporation<br>Pittsburgh, Pa. |

[54] LOAD TAP CHANGER SYSTEM INCLUDING PROTECTIVE APPARATUS FOR MONITORING THE OPERATION THEREOF
8 Claims, 15 Drawing Figs.

| [52] | U.S. Cl. | 323/43.5 R, 317/11 E, 317/58 |
|---|---|---|
| [51] | Int. Cl. | G05f 1/14 |
| [50] | Field of Search | 317/11 E, 58, 12 R, 12 A, 12 B; 323/9, 43.5 R |

[56] References Cited
UNITED STATES PATENTS

| 2,743,395 | 4/1956 | Marbury et al. | 323/43.5 X |
|---|---|---|---|
| 2,875,399 | 2/1959 | Deniau | 323/43.5 |
| 3,411,038 | 11/1968 | Lee | 317/12 X |
| 3,436,646 | 4/1969 | Prescott | 323/43.5 |

*Primary Examiner*—A. D. Pellinen
*Attorneys*—A. T. Stratton, F. E. Browder and D. R. Lackey

ABSTRACT: A load tap changer system for electrical transformers, including a tap selector switch, a bypass switch, a vacuum switch, and a divider reactor, interconnected to interrupt load current in the vacuum switch during a top change cycle. Protective apparatus, including a current transformer, and a shorting switch connected across the output terminals of the current transformer, prevents operation of the tap selector switch when it would be damaged by interrupting load current.

INVENTORS
Thomas B. Topper &
Gilbert D. Throop.
BY
ATTORNEY

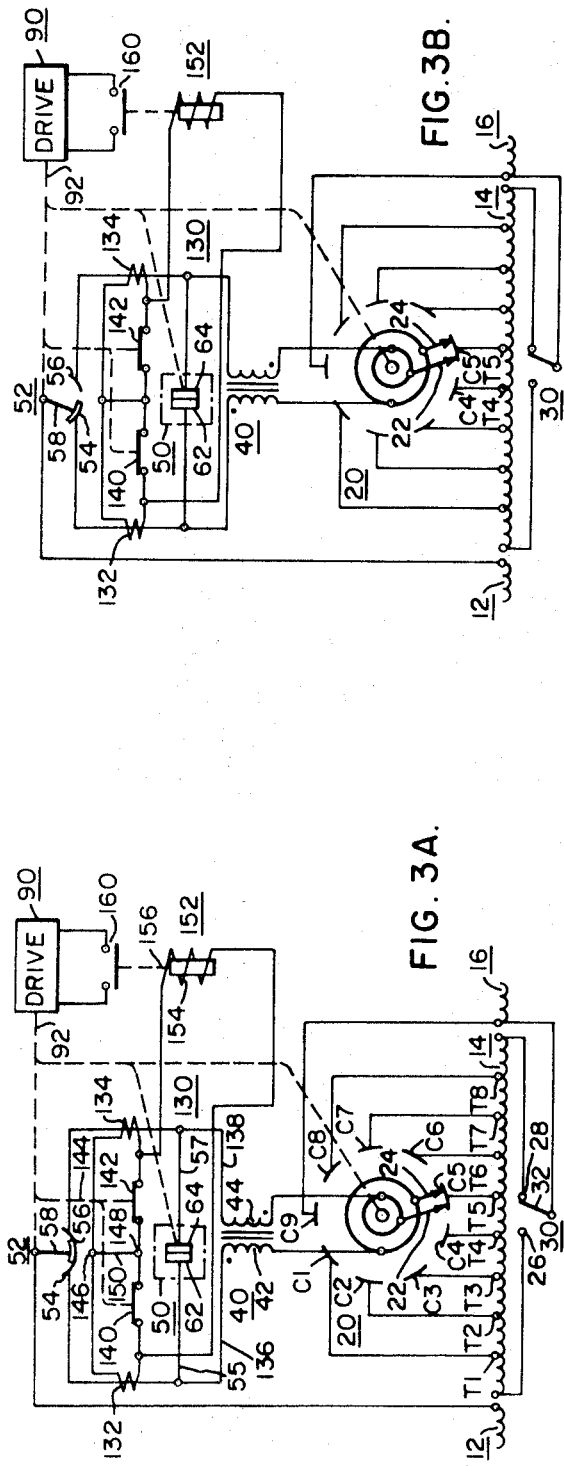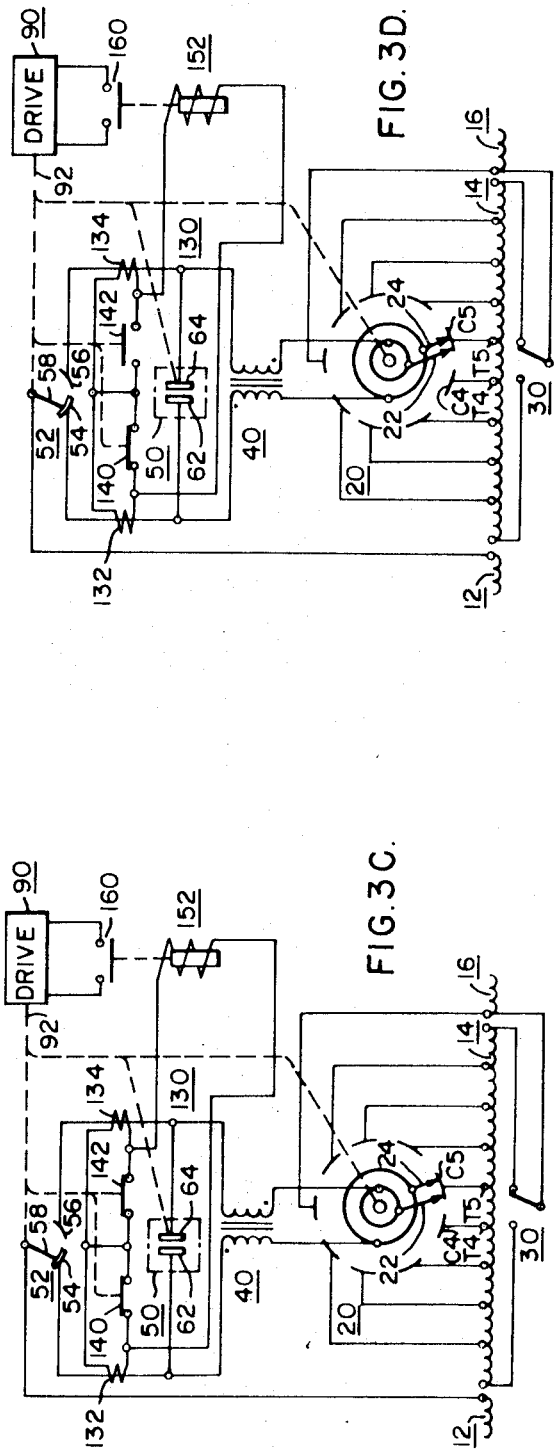

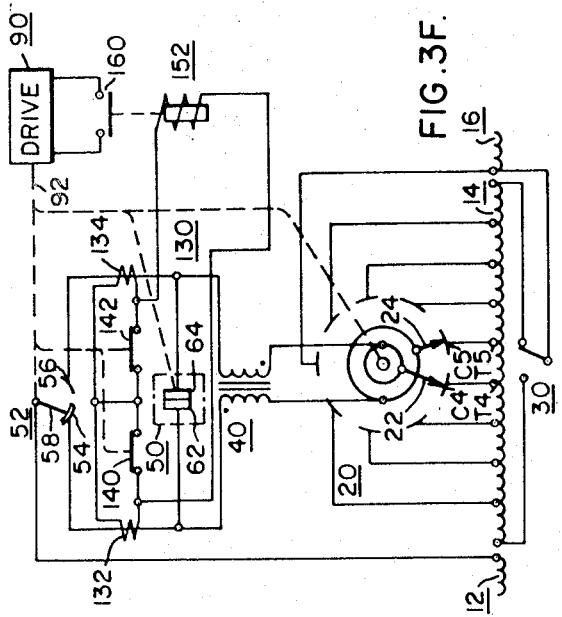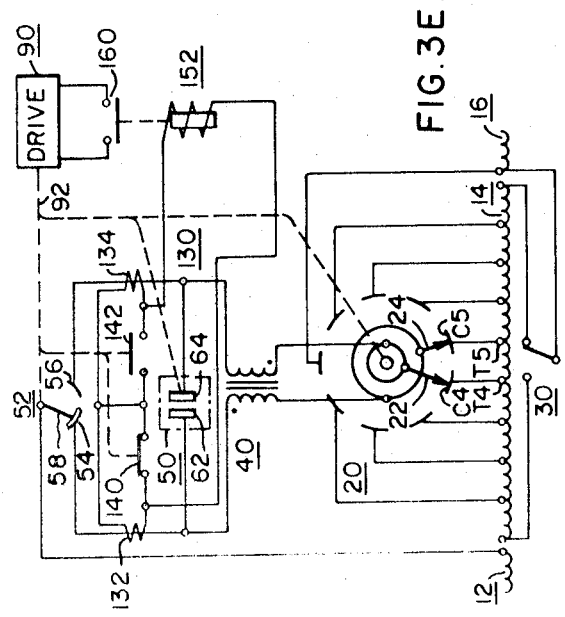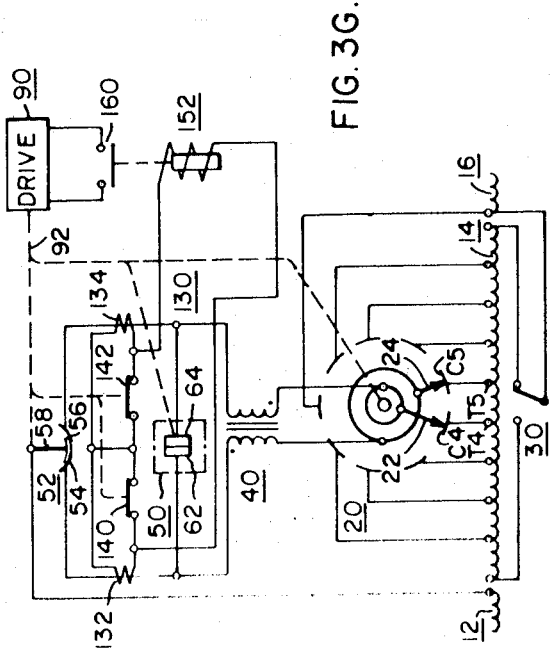

3,622,867

LOAD TAP CHANGER SYSTEM INCLUDING PROTECTIVE APPARATUS FOR MONITORING THE OPERATION THEREOF

BACKGROUND OF THE INVENTION

1. Field of the Invention

The invention relates in general to load tap changer systems, and more specifically to protective apparatus for tap changer systems of the type which interrupt load current during its tap change cycle in a vacuum switch.

2. Description of the Prior Art

Tap changer apparatus for changing taps on a transformer winding without disconnecting the load, commonly utilizes a no-load-type tap selector switch having first and second movable contact arms, a divided reactor having first and second winding portions for reducing the magnitude of the circulating current when the tap changer apparatus is bridging two taps, a vacuum switch, and a bypass switch which shorts the vacuum switch when the tap changer is not in a tap change cycle, to reduce the heating of the vacuum switch contacts. The bypass switch has first and second contacts connected in first and second branch circuits, and a third contact connected to the main power circuit, with the bypass switch being actuable to connect the main power circuit to either or both of the first and second branch circuits. The first branch circuit includes the first contact arm of the tap selector switch, the first winding portion of the divided reactor, and the first contact of the bypass switch. The second branch circuit includes the second contact arm of the tap selector switch, the second winding portion of the divided reactor, and the second terminal of the bypass switch. The vacuum switch is connected between the first and second terminals of the bypass switch. During a tap change cycle, the bypass switch opens a preselected branch circuit, without substantial arcing, as the vacuum switch is closed at this point, with the current being transferred from the opening side of the bypass switch to the vacuum switch. The vacuum switch then opens its contacts to isolate the selected branch circuit, allowing the contact arm of the tap selector switch connected in that branch circuit to move to a new tap position without arcing. The vacuum switch and bypass switch then sequentially reclose to complete the tap change operation. A tap changer system of this type, and an operating mechanism for operating the vacuum switch, is described in copending application Ser. No. 792,349, filed Jan. 21, 1969, now U.S. Pat. No. 3,553,395.

It is important not to move a contact arm of the tap selector switch when load current is flowing therethrough. For example, the contact arm may be called upon to interrupt load current due to failure of the bypass switch to open the branch circuit of the contact arm which must move to a new contact position during the prescribed tap change cycle, or failure of the vacuum switch in interrupt load current such as due to loss of vacuum, or failure of the vacuum switch operating mechanism to open the contacts of the vacuum switch. Many prior art protective arrangements have been used to monitor tap change systems, to protect against damaging the no-load tap selector switch, but all have had disadvantages such as providing incomplete protection, or being relatively costly, or both. For example, protective circuits which monitor the vacuum of the vacuum switch do not indicate whether the bypass switch has operated properly, or whether the vacuum switch operating mechanism has opened the contacts of the vacuum switch. Circuits which monitor current flow through the vacuum switch do not indicate whether the bypass switch has operated properly. Also, the tap changer systems of the prior art become extremely costly when used in high voltage apparatus due to the requirement of insulating the protective circuitry, such as current transformers and the like, from ground.

Thus, it would be desirable to provide new and improved protective apparatus for tap changer systems of the type which utilize a single vacuum switch, which protective system provides complete protection for the tap selector switch, and which system has a relatively low manufacturing cost regardless of the voltage level of the transformer winding that the tap changer system is associated with.

SUMMARY OF THE INVENTION

Briefly, the present invention is a load tap changer system of the type which utilizes a single vacuum switch, having new and improved protective circuitry for protecting the tap selector switch from damage due to being called upon to interrupt load current. In a first embodiment of the invention, a current transformer is disposed to provide a signal responsive to current flow through the vacuum switch, with shorting or switching means being connected across the output terminals of the current transformer. The output terminals of the current transformer are shorted by this switching means, except immediately prior to operation of the tap selector switch. If the current transformer is providing an output signal when the shorting switch across its output terminal is opened, this signal is used to either deenergize the transformer, or to prevent further operation of the tap changer. The current transformer is connected to the electromagnetic coil of a solenoid. The moving core of the solenoid, when the solenoid is energized by the current transformer, actuates contacts in electrical circuitry for disabling the tap changer, or for deenergizing the transformer. The moving core of the solenoid actuates the electrical contacts in the protective circuitry through an insulating rod member, making it unnecessary to insulate the current transformer and solenoid coil for the voltage between the transformer winding and ground. The length of the insulating rod is the only variable as the protective apparatus is applied to transformers of different voltage ratings.

The first embodiment provides more protection than systems which merely monitor the vacuum of the vacuum switch, as it also indicates whether or not the operating mechanism of the vacuum switch has operated properly.

A second embodiment of the invention provides the protection obtainable in the first embodiment, and additionally insures that the bypass switch has operated properly, by using a current transformer with shorting means connected across its output terminals, in both branch circuits of the tap changer system. Electrical circuitry is also disclosed which enables a single solenoid coil to be used in this embodiment, even though two current transformers are utilized, and the isolating arrangement of the first embodiment may also be used in the second embodiment, to provide a relatively low cost protective system regardless of the operating voltage of the transformer winding.

BRIEF DESCRIPTION OF THE DRAWINGS

The invention may be more readily understood when considered in view of the following detailed description of exemplary embodiments thereof, taken in connection with the accompanying drawings, in which:

FIGS. 3A through 3G are schematic diagrams which sequentially illustrate the operation of a protected tap changer system constructed according to another embodiment of the invention.

DESCRIPTION OF THE PREFERRED EMBODIMENTS

Figure 1A:
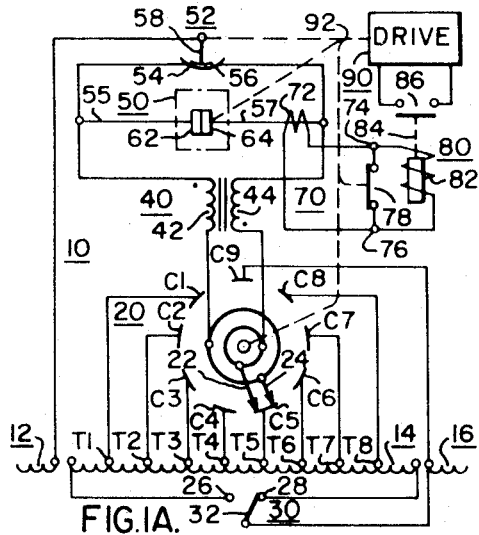
FIGS. 1A through 1G are schematic diagrams which sequentially illustrate the operation of a protective tap changer system, constructed according to an embodiment of the invention.

Referring now to the drawings, and FIG. 1A in particular, there is shown a schematic diagram of a tap changer system 10 which may utilize the teachings of the invention. As illustrated in FIG. 1A, tap changer system 10 may be connected to the windings 12, 14 and 16 of an electrical transformer. The transformer may be single or polyphase, and of either the autotransformer or isolated winding type, with only a portion of a single phase being illustrated in FIG. 1A, as other phases would be similarly arranged.

Tap changer system 10 is of the type which includes a no-load-type tap selector switch 20, having a plurality of stationary contacts C1 through C8 connected to taps T1 through T8, respectively, on winding 14, and a stationary contact C9 connected to winding 16. Tap selector switch 20 has a pair of movable contact arms 22 and 24 for selectively and sequentially moving between the spaced stationary contacts C1 through C9. The ends of tapped winding 14 are connected to the stationary contacts 26 and 28 of a reversing switch 30, which has a movable contact arm 32 connected to winding 16, and thus to stationary contact C9 of tap selector switch 20. The reversing switch 30 may be actuated to change its movable contact 32 from one stationary contact to the other, when one of the movable contact arms, 22 or 24, of the tap selector switch 20 is in engagement with the stationary contact C9, and the other contact arm is in transition to or from contact C9, to add the tapped voltage to, or subtract it from, the voltage of windings 12 and 14, depending upon the position of the reversing switch 30.

In order to enable the movable contact arms 22 and 24 to be connected to adjacent taps, and thus bridge a portion of winding 14, and also enable the tap changer system to operate continuously, in a bridging position and obtain a voltage half way between the voltage of two adjacent taps, the contact arms are connected to windings 12 through a split or divided reactor 40 having winding portions 42 and 44 disposed on a common magnetic core. The winding portions are wound to present a high impedance to circulating currents, while providing very little impedance to power current flow through the two winding portions.

A single, arcing duty, normally closed vacuum switch 50, and a bypass switch 52, complete the tap changer system 10, with the bypass switch 52 having first and second stationary contacts 54 and 56, and a movable contact 58. The movable contact 58 is connected to winding 12, and the stationary contacts 54 and 56 are connected to winding sections 42 and 44 of reactor 40. A movable contact 58 is arranged to engage both stationary contacts 54 and 56, or to select either of the stationary contacts individually. The vacuum switch 50 has contacts 62 and 64 disposed within an evacuated envelope, with one of the contacts being movable relative to the other, via a bellows, which maintains the vacuum seal. The vacuum switch 50 is connected across contacts 54 and 56 of the bypass switch 52, via conductors 55 and 57.

When the tap changer system 10 is in a steady state position, the power circuit of the transformer includes winding 16, the portion of winding 14 between the selected position of the reversing switch 30 and the tap or taps selected by the contact arms 22 and 24, through the two branch circuits of the contact arms. One of the branch circuits includes contact arm 24, winding section 42, and the position of the bypass switch 52 which includes stationary contact 54; and, the other branch circuit includes contact arm 22, winding section 44, and the position of bypass switch 52 which includes stationary contact 56. The branch circuits combine in the movable contact 58 of bypass switch 52, and the power circuit continues to winding 12. Instead of having tapped winding 14 connected between two windings of the transformer, it may also be disposed at either end of a main transformer winding.

The vacuum switch 50 has its contacts closed, during normal steady state operation of the tap changer, but since it is normally shorted by the bypass switch 50, there is negligible current flow therethrough, and thus very little heating of the vacuum switch contacts.

Tap changer apparatus 10 includes protective apparatus 70 for protecting the tap selector switch 20 against operation while load current is flowing through the contact arm scheduled to move during a tap change cycle. Protective apparatus 70 includes a current transformer 72 disposed to provide a signal at its output terminals 74 and 76 responsive to current flow through the vacuum switch 50, such as by being mounted on conductor 57, as illustrated. Shorting means, such as a switch 78, is connected across the output terminals 74 and 76 of current transformer 72. A solenoid 80 having an electromagnetic coil 82 and moving core and operating mechanism shown generally at 84, and a set of electrical contacts 86 which are actuated between open and closed positions by the operating mechanism 84, completes the protective apparatus 70. The electromagnetic coil 82 of solenoid 80 is connected to the output terminals 74 and 76 of current transformer 72, and, in this embodiment, the contacts 86 responsive to solenoid 80 are connected in an electric circuit associated with the tap changer drive means 90. The tap changer drive means 90 may include a reversible electric motor and control shaft, with suitable mechanical linkages, cams, and the like, associated with the control shaft for operating the bypass switch 52, the vacuum switch 50, the contact arms of tap selector switch 20, and the electrical contacts 78, in a predetermined sequence, with the mechanical linkage between the drive means 90 and these devices being shown generally by the dotted lines 92.

The contacts 86 of protective apparatus 70 are shown connected to drive means 90, and may be used to disable or stop the drive means. However, it would be equally suitable to connect contacts 86 to apparatus for deenergizing the transformer, if the application is such that deenergizing the transformer would not be detrimental to the load. As illustrated, contacts 86 are shown normally open, i.e., open when the solenoid 80 is not energized, but they may be normally open or normally closed, as required by the circuitry with which they are associated.

In the operation of the protective apparatus 70, the switching or shorting means 78 is normally closed, preventing any output signal provided by current transformer 72 from being applied to solenoid 80, until just prior to the movement of a contact arm of tap selector switch 20 during a tap change cycle. After the bypass switch has opened a predetermined branch circuit, to transfer current to the vacuum switch, and the vacuum switch has opened to interrupt load current flow in the selected branch, shorting means 78 has its contacts opened by drive means 90. If there is no current flowing through vacuum switch 50, current transformer 72 will not provide a signal and solenoid 80 will be actuated. In this instance, the tap change cycle is allowed to continue. If current is flowing through vacuum switch 50, the no-load tap selector switch 20 should not move its contact arms, and current transformer 72 will provide an output signal, actuating the solenoid 80. Solenoid 80 then actuates contacts 86, closing them, in this example, which contacts are connected to stop the tap changer drive, deenergize the transformer, sound an alarm, or initiate any other desired protective function. In order to make the solenoid 80 sensitive to low current flow, without being subjected to excessive voltages at high current flow through the vacuum switch 50, voltage limiting means (not shown), may be connected across the solenoid coil 82, such as back-to-back connected zener diodes. The operation of protective apparatus 70 may be more readily understood by describing a tap change cycle, as illustrated in FIGS. 1A through 1G.

Figure 1B:
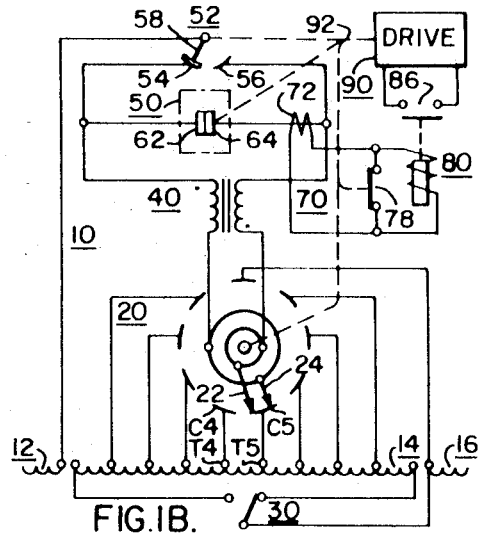

Assuming that both contact arms of tap selector switch 20 are in engagement with contact C5, and it is desired to operate on both contacts C4 and C5, such as signalled by a voltage sensing circuit [not shown], tap changer drive means 90 will sequentially operate the bypass switch 52, the vacuum switch 50, and the tap selector switch 20, via suitable mechanical means, generally indicated by dotted lines 92. The first step in the tap change cycle is to open one side of the bypass switch 52. Since tap selector contact arm 22 must eventually be moved to operate in the desired new position of the tap selector switch 20, the position of bypass switch 52 connected to contact arm 22 must open. This step is illustrated in FIG. 1B. The current flowing through winding 44 and contact arm 22 will not by interrupted, however, when the movable contact arm 58 of the bypass switch 52 opens the branch circuit which includes stationary contact 56 of the bypass switch, as the circuit through winding section 44 and tap selector contact arm 22 will be maintained through the vacuum switch 50. Thus, there will be very little arcing when the bypass switch 52 opens the branch circuit which includes its stationary contact 56.

Figure 1C:
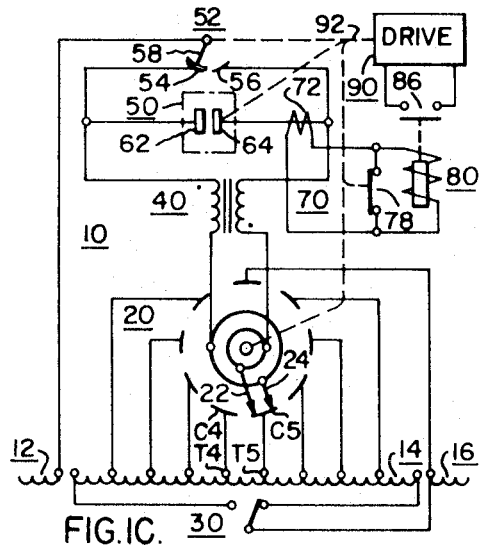

The next step of the tap change cycle, shown in FIG. 1C, is to isolate the branch contact arm 22, by opening vacuum switch 50. Since the current in the selected branch is interrupted by vacuum switch 50, arcing will occur but it will be quickly extinguished due to the vacuum surrounding the contacts.

Figure 1D:
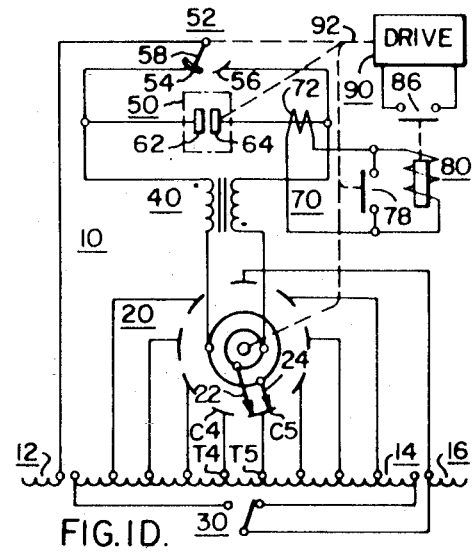
Figure 1E:
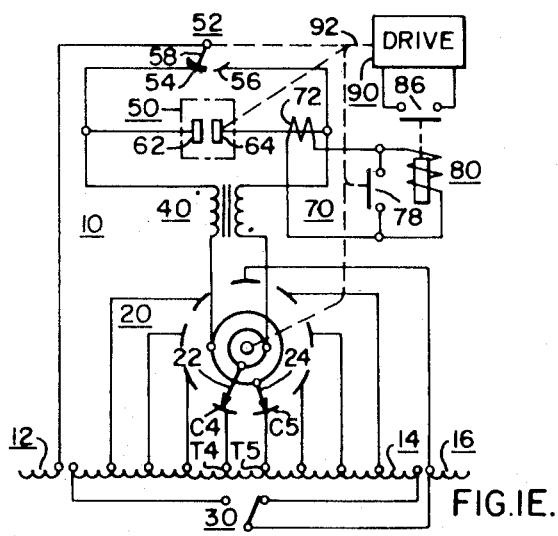

The next step, shown in FIG. 1D, is to open electrical contact 78. If for any reason, electrical current is still flowing through vacuum switch 50, such as due to the failure of the vacuum switch operating mechanism to open the contacts of the vacuum switch, or due to the loss of vacuum in the vacuum switch, current transformer 72 will energize solenoid 80 upon removal of the shorting means across its output terminals, i.e., the opening of contact 78, and this signal will initiate the protective function of the protective apparatus 70. If there is no current flow through vacuum switch 50, current transformer 72 will not provide a signal, and the tap change cycle will continue. Assuming there is no current flowing through vacuum switch 50 at this point of the tap change cycle, contact arm 22 is free to move to contact C4 without arcing, with this step being illustrated in FIG. 1E.

Figure 1F:
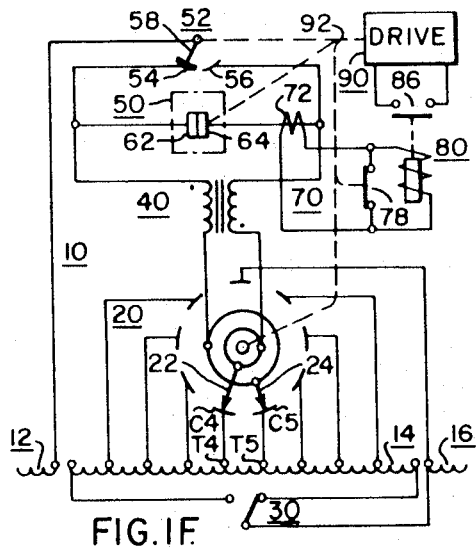
Figure 1G:
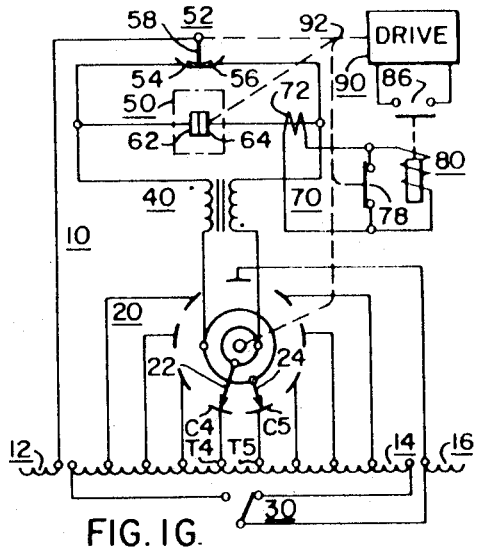

The next step of the tap change cycle, shown in FIG. 1F, is to reclose the shorting contacts 78, and then the contacts of the vacuum switch 50 are reclosed, which step is also shown in FIG. 1F, to reestablish a circuit through winding portion 44 of reactor 40 and the movable contact arm 22 of the tap selector switch 20. The last step of the tap change cycle, shown in FIG. 1G, is to reclose the position of bypass switch 52 which includes its stationary contact 56. Thus, the contacts of vacuum switch 50 are again shorted by the bypass switch, and very little current will flow through the contacts of the vacuum switch. If, for example, the voltage sensing means (not shown) signals the tap changer system 10 to operate with both contact arms 22 and 24 on contact C4, the next portion of the tap change cycle would be similar to that already described, except bypass switch 52 would open its position which includes stationary contact 54, and contact arm 24 would then move instead of contact arm 22.

Figure 2:
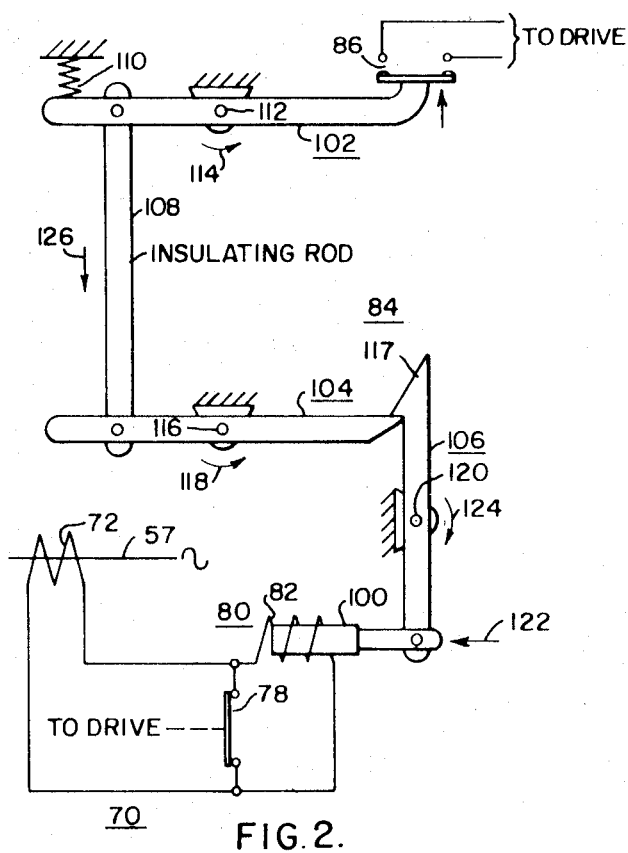
FIG. 2 is a partially schematic and partially diagrammatic view of isolating apparatus suitable for use with the protected tap changer system shown in the schematic diagrams of FIGS. 1A through 1G.

Protective apparatus 70 shown in FIG. 1A may be constructed as illustrated in FIG. 2, to provide electrical isolation between the tap changer system 10 and the protective circuit for stopping the tap changer drive, or for deenergizing the transformer. Specifically, the operating mechanism 84, responsive to solenoid 80 for actuating electrical contacts 86, may include the moving iron core 100 of solenoid 80, pivotally fixed members 102, 104 and 106, insulating rod member 108, and a spring 110.

The movable portion of electrical contact 86 is fixed to one end of the pivotally fixed member 102, and the other end of member 102 is urged about a fixed pivot point 112, in the direction of arrow 114, by the spring 110. Member 102 is restrained from pivoting about point 112 by the insulating rod member 108, and the pivotally fixed members 104 and 106. Insulating rod 108 has one of its ends pivotally fixed to the end of member 102 associated with the spring member 110, and its other end is pivotally fixed to one end of member 104. Member 104, which pivots about point 116, has its other end restrained by end 117 of member 106, which is shaped in the form of a latch to prevent member 104 from pivoting about its pivot point 116 in the direction of the arrow 118. Member 106, which is pivotally fixed at point 120, has its other end pivotally fixed to the moving core 110 of solenoid 80. When solenoid 80 is deenergized and the operating mechanism 84 is "set," end 117 of member 106 prevents member 104 from rotating in the direction of arrow 118, as urged by insulating rod member 108 and the spring loaded member 102. When solenoid 80 is energized, its movable core 100 is moved in the direction of arrow 122, pivoting member 106 about point 120 in the direction of arrow 124. This action removes the latch from member 104, and member 104 pivots about point 116 in the direction of arrow 118, with the insulating rod member moving in the direction of arrow 126 as spring 110 releases its stored energy and pivots member 102 about point 112. This action closes the electrical contacts 86. The advantage of this arrangement is the fact that the insulating rod 108 electrically isolates the current transformer 72 and solenoid 80 from the protective circuit in which the contacts 86 are connected. Thus, current transformer 72 and solenoid 80 do not have to be electrically insulated for the full voltage from the tap changer to ground, resulting in economies in the manufacture of these items, especially when they are applied to extra high voltage transformers [EHV]. The voltage rating of the transformer will determine the length of the insulating rod 108.

While protective apparatus 70 shown in FIGS. 1A through 1G will protect the tap selector switch 20 from malfunction of the vacuum switch, or its operating mechanism, it will not protect the tap selector switch from malfunction of the bypass switch 52. To provide complete protection, the protective apparatus should protect the tap selector switch against malfunction of both the bypass switch 52 and the vacuum switch 50.

FIG. 3A illustrates the tap changer system 10 of FIG. 1A, except with protective apparatus 130 constructed according to an embodiment of the invention which will provide complete protection for the tap selector switch 20. Since the tap changer system 10 is constructed and arranged in a similar manner in both FIGS. 1A and 3A, like reference numerals are used in the Figures to indicate like components.

Protective apparatus 130 includes current transformers 132 and 134 disposed to provide output signals responsive to current flow through the first and second branch circuits, i.e., through the conductor 136 which interconnects terminal 54 of bypass switch 52 and winding portion 42 of reactor 40, and through conductor 138 which interconnects terminal 56 of bypass switch 52 and winding portion 44 of reactor 40. Shorting or switching means 140 and 142 are disposed to short the output terminals of current transformers 132 and 134, respectively, when the contacts of the shorting means are closed, with the opening and the closing of the shorting or switching means 140 and 142 being responsive to drive means 90, as illustrated generally by dotted line 144.

Each of the switching means 140 and 412 may be independently connected across the output terminals of current transformers 132 and 134, respectively, and the output terminals of each current transformer may be connected to a separate solenoid coil, which solenoid coils are arranged to actuate electrical contacts in a protective circuit, as hereinbefore described relative to the embodiment of the invention shown in FIG. 1A. However, by following the teachings of the invention shown in FIG. 3A, one of the solenoid coils, its operating linkage and one set of electrical contacts, may be eliminated by connecting switching means 140 and 142 such that when they are in their closed positions, they provide first and second circuits which short the output terminals of current transformers 132, and 134, respectively, with the first and second shorting circuits having a common portion.

More specifically, one end of each of the current transformers 132 and 134 is connected to a common terminal 146, and the other ends of current transformers 132 and 134 are connected together via switching means 140 and 142, which are serially connected at terminal 148, and terminals 146 and 148 are interconnected via conductor 150. Thus, the first shorting circuit proceeds from one end of current transformer 132 to terminal 146, is continues to terminal 148 via conductor 150, and then via switching means 140 to the other end of current transformer 132. The second shorting circuit proceeds from one end of current transformer 134 to terminal 146, its proceeds to terminal 148 via conductor 150, and then proceeds to the other end of current transformer 134 via switching means 142. Therefore, conductor 150 forms the common portion of the two shorting circuits. The switching or shorting means 140 and 142 are responsive to drive means 90, with switching means 140 opening during a tap change cycle just prior to movement of contact arm 24, to check the first branch circuit for current flow, and with switching means 142 opening during a tap change cycle just prior to movement of contact arm 22, to check the second branch circuit for current flow.

An electrical solenoid 152 having an electromagnetic coil 154 and a moving core and operating linkage shown generally at 156, has its electrical coil connected across the serially connected switching means 140 and 142. Suitable voltage limiting means may be connected across coil 154, as hereinbefore described relative to the coil of solenoid 80 in FIG. 1A. When switching means 142 opens in response to drive means 90, to check for current flow in conductor 138 during a tap change cycle, the solenoid coil 154 will be connected from one side of current transformer 134, to the other side through the closed switching means 140 and conductor 150. When switching means 140 opens in response to drive means 90, to check for current flow in conductor 136 during a tap change cycle, solenoid coil 154 will be connected from one side of current transformer 132, to the other side through the closed switching means 142 and conductor 150.

Solenoid 152 actuates a set of electrical contacts 160, when its electromagnetic coil is energized, which contacts may be connected to the drive means 90, as illustrated, or to deenergize the transformer, or in any other desirable protective circuit. The operating linkage shown generally at 156 for actuating contacts 160, may be constructed as hereinbefore described relative to FIG. 2.

The operation of the tap change cycle for the embodiment of the invention shown in FIG. 3A, is illustrated in FIGS. 3B through 3G. Assuming that the contact arms 22 and 24 are in engagement with contact C5, and that it is desirable to move contact arm 22 to engage contact C4, tap changer drive means 90 will sequentially operate the bypass switch 52, the vacuum switch 50, and the tap selector switch 20, via suitable mechanical means. The first step in the tap change cycle is to open one side of the bypass switch 52. Since, in this example, tap selector contact arm 22 must eventually move to operate in the required new position of the tap selector switch 20, the position of bypass switch 52 connected to contact arm 22 must open. This step is illustrated in FIG. 3B. The current flowing through winding 44 and contact arm 22 will not be interrupted, however, when the movable arm 58 of the bypass switch 52 opens the branch circuit which includes the stationary contact 56 of the bypass switch, as the circuit through winding section 44 and tap selector switch contact arm 22 will be maintained through the closed vacuum switch 50. Thus, there will be very little arcing when the bypass switch 52 opens the branch circuit which includes its stationary contact 56.

The next step of the tap change cycle, shown in FIG. 3C, is to isolate the branch which includes contact arm 22, by operating vacuum switch 50. Since the current in the branch is interrupted by vacuum switch 50, arcing will occur but is will be quickly extinguished due to the vacuum surrounding the contacts.

The next step, shown in FIG. 3D, is to open the contacts 142 which are shorting the output terminals of current transformer 134. If for any reason current is still flowing through conductor 138, such as due to the failure of the bypass switch 52 to operate, the failure of the vacuum switch operating mechanism, or the failure of the vacuum switch to interrupt load current, such as due to loss of vacuum, current transformer 134 will energize solenoid 159 and initiate the protective function. If there is no current flowing through conductor 138, current transformer 134 will not provide a signal, and the tap change cycle will continue.

Assuming there is no current flowing through conductor 138 at this point, contact arm 22 is free to move to contact C4 without arcing, with this step being illustrated in FIG. 3E.

The next step of the tap change cycle, shown in FIG. 3F, is to reclose contacts 142, and then reclose the vacuum switch 50, which step is also shown in FIG. 3F, with the latter step reestablishing a circuit through winding section 44 and the movable contact arm 22 of the tap selector switch 20.

The last step of the tap change cycle, shown in FIG. 3G, is to reclose the position of bypass switch 52 which includes its stationary contact 56. Thus, the vacuum switch 50 is again shorted by the bypass switch 52, and very little current will flow through the contacts of the vacuum switch. If, for example, the voltage sensing means (not shown) signals the tap changer system to operate with both contact arms 22 and 24 on contact C4, the next portion of the tap change cycle would be similar to that already described, except bypass switch 52 would open its position which includes stationary contact 54, the shorting contacts 140 would open during the tap change cycle, rather than the shorting contacts 142, and contact arm 24 of the tap selector switch would move instead of contact arm 22.

In summary, there has been disclosed new and improved tap changer apparatus which includes protective circuitry for insuring that the no-load contact arms of the tap selector switch will not be damaged by a malfunction in the tap changer system which would call upon a contact arm to move when current is flowing therethrough. The protective apparatus disclosed in a first embodiment of the invention protects the tap selector switch against damage due to a malfunction in the vacuum switch, either in the vacuum switch operating mechanism, or due to failure of the vacuum switch to interrupt load current, such as when the vacuum switch is called upon to switch after losing its vacuum. In a second embodiment of the invention, the protective apparatus protects the tap selector switch against malfunction of either the bypass switch or the vacuum switch. In this embodiment, the protection achieved by the first embodiment is maintained, adding to it protection against failure of the bypass switch to open the prescribed branch circuit during the tap change cycle. Both embodiments of the invention may utilize a new and improved isolating mechanism, which enables the current transformers and solenoid to be constructed without fully insulating these devices from ground, by utilizing an insulating rod to perform the isolating function. Thus, the protective system disclosed may be used with any voltage rating, with the variable in the system being the length of the insulating rod, for the different voltage classes.

We claim as our invention:

1. A load tap changer system comprising:
   tap selector switching means having first and second contact arms selectively movable between a plurality of electrical contacts, said plurality of electrical contacts being adapted for connection to taps on an electrical winding disposed to supply current to a load circuit,
   reactor means having first and second winding portions,
   bypass switching means having first, second and third terminals, actuable to connect the third terminal to either or both of the first and second terminals, said third terminal being adapted for connection in the load circuit,
   means serially connecting said first contact arm and the first winding portion of said reactor means to the first terminal of said bypass switching means,
   means serially connecting said contact arm and the second winding portion of said reactor means to the second terminal of said bypass switching means,
   a vacuum switch connected between the first and second terminals of said bypass switching means,
   drive means for sequentially operating said bypass switching means, said vacuum switch, and said tap selector switching means during a tap change cycle,
   a current transformer having output terminals, said current transformer providing a signal at its output terminals responsive to the magnitude of the current flowing through said vacuum switch, shorting means having open and closed positions responsive to said drive means, said shorting means being connected across the output terminals of said current transformer, said shorting means being normally closed, shorting the output terminals of said current transformer, said shorting means being actuated by said drive means to its open position immediately prior to movement of a contact arm of said tap selector switching means, and protective means preventing the operation of said tap selector switch while current is flowing through said vacuum switch, said protective means being connected to the output terminals of said current transformer, being responsive to the signal provided by said current transformer when the output terminals of said current transformer are not shorted by said shorting means.

2. The load tap changer system of claim 1 wherein the drive means is mechanically linked to the bypass switching means, the vacuum switch, and the tap selector switching means such that when a tap change is desired the drive means sequentially actuates said bypass switching means to connect its third terminal to only one of its other terminals, opens said vacuum switch, opens said shorting means, moves the contact arm connected to the terminal of said bypass switching means which is not connected to its third terminal, to a different electrical contact, closes said shorting means, closes said vacuum switch, and actuates said bypass switching means to connect its third terminal to both its first and second terminals.

3. The load tap changer system of claim 1 wherein the protective means includes an electrical solenoid, an insulating member mechanically linked to said electrical solenoid, and electrical contacts operable between first and second positions in response to movement of said insulating member, said electrical solenoid being connected to the output terminals of the current transformer, effecting movement of said insulating member to change the electrical contacts from their first to their second positions when said electrical solenoid is energized, said electrical contacts being connected in a protective circuit adapted to prevent operation of the tap selector switching means when current is flowing through the vacuum switch and said electrical contacts are in their second position, with the protective circuit being electrically isolated from the electrical transformer by said insulating member.

4. A load tap changer system comprising:
tap selector switching means having first and second contact arms selectively movable between a plurality of electrical contacts, said plurality of electrical contacts being adapted for connection to taps on an electrical winding disposed to supply current to a load circuit,
reactor means having first and second winding portions,
bypass switching means having first, second and third terminals, actuable to connect the third terminal to either or both of the first and second terminals, said third terminal being adapted for connection in the load circuit,
means serially connecting said first contact arm and the first winding portion of said reactor means to the first terminal of said bypass switching means, providing a first series branch,
means serially connecting said second contact arm and the second winding portion of said reactor means to the second terminal of said bypass switching means, providing a second series branch,
a vacuum switch connected between the first and second terminals of said bypass switching means,
drive means for sequentially operating said bypass switching means, said vacuum switch, and said tap selector switching means, when it is desired to change the operating position of the tap changer apparatus,
first and second current transformers each having output terminals, said first and second current transformers being disposed to provide signals at their respective output terminals responsive to current flow through said first and second series branches, respectively, first and second shorting means each having open and closed positions responsive to said drive means, said first and second shorting means being connected across the output terminals of said first and second current transformers, respectively, said first and second shorting means being normally closed, shorting the output terminals of said first and second current transformers, respectively, said first and second shorting means being actuated to their open positions by said drive means immediately prior to movement of said first and second contact arms, respectively, and protective means preventing the operation of said tap selector switch when current is flowing through the series branch of the contact arm of said tap selector switching means which is required to open to carry out the desired tap change, said protective means being connected to said first and second shorting means, said protective means being responsive to a signal provided by a current transformer, when the output terminals of that current transformer are not shorted by its associated shorting means.

5. The load tap changer system of claim 4 wherein
the protective means includes a single electrical solenoid connected across the first and second current transformers.

6. The load tap changer system of claim 4 wherein the drive means is mechanically linked to the bypass switching means, the vacuum switch, the first and second shorting means, and the tap selector switching means, such that when a tap change is desired the drive means sequentially actuates said bypass switching means to connect its third terminal to only one of its other terminals, opens said vacuum switch, opens the shorting means associated with the current transformer disposed to measure current in the branch circuit which has been opened by the bypass switching means, moves the contact arm connected to the terminal of said bypass switching means which is not connected to its third terminal, to a different electrical contact, closes the shorting means, closes said vacuum switch, and actuates said bypass switching means to connect its third terminal to both its first and second terminals.

7. A load tap changer system comprising:
tap selector switching means having first and second contact arms selectively movable between a plurality of electrical contacts, said plurality of electrical contacts being adapted for connection to taps on an electrical winding disposed to supply current to a load circuit,
reactor means having first and second winding portions,
bypass switching means having first, second and third terminals, actuable to connect the third terminal to either or both of the first and second terminals, said third terminal being adapted for connection in the load circuit,
means serially connecting said first contact arm and the first winding portion of said reactor means to the first terminal of said bypass switching means, providing a first series branch,
means serially connecting said second contact arm and the second winding portion of said reactor means to the second terminal of said bypass switching means, providing a second series branch,
a vacuum switch connected between the first and second terminals of said bypass switching means,
drive means for sequentially operating said bypass switching means,, said vacuum switch, and said tap selector switching means, when it is desired to change the operating position of the tap changer apparatus,
first and second current transformers each having output terminals, said first and second current transformers being disposed to provide signals at their respective output terminals responsive to current flow through said first and second series branches, respectively,
first and second shorting means each having open and closed positions responsive to said drive means, said first and second shorting means being connected across the output terminals of said first and second current transformers, respectively, said first and second shorting means being normally closed, shorting the output terminals of said first and second current transformers, respectively, said first and second shorting means being actuated to their open positions by said drive means immediately prior to movement of said first and second contact arms, respectively, said first and second shorting means shorting the terminals of the first and second current transformers when in their closed positions through first and second circuits which have a common portion, and protective means preventing the operation of said tap selector switch when current is flowing through the series branch of the contact arm of said tap selector switching means which is required to open to carry out the desired tap change, said protective means including a single electrical solenoid connected across both said first and second shorting means, completing the circuit across a current transformer whose shorting means is in the open position, through the closed shorting means associated with the other current transformer.

8. The load tap changer system of claim 7, including an insulating member mechanically linked to the electrical solenoid, and electrical contacts operable between said first and second positions in response to movement of said insulating member, said electrical contacts being connected in a protective circuit, with the protective circuit being electrically isolated from the electrical transformer by the insulating member.

* * * * *

UNITED STATES PATENT OFFICE
CERTIFICATE OF CORRECTION

PATENT NO. : 3,622,867
DATED : November 23, 1971
INVENTOR(S) : Thomas B. Topper, et al It is certified that error appears in the above-identified patent and that said Letters Patent are hereby corrected as shown below:

Column 8, line 64, before "contact" insert -- second --.

Signed and sealed this 1st day of July 1975.

(SEAL)
Attest:

RUTH C. MASON
Attesting Officer

C. MARSHALL DANN
Commissioner of Patents
and Trademarks